April 6, 1926.

G. MOEBES 1,579,383

FLOOR BOARD SHIELD FOR AUTOMOBILES

Filed Feb. 28, 1924

INVENTOR.
Gus Moebes.

BY
Dewey, Strong, Townsend & Loftus
ATTORNEYS.

Patented Apr. 6, 1926.

1,579,383

UNITED STATES PATENT OFFICE.

GUS MOEBES, OF VISALIA, CALIFORNIA, ASSIGNOR OF ONE-HALF TO MELVIN J. WHEELER, OF VISALIA, CALIFORNIA.

FLOOR-BOARD SHIELD FOR AUTOMOBILES.

Application filed February 28, 1924. Serial No. 695,643.

*To all whom it may concern:*

Be it known that I, GUS MOEBES, a citizen of the United States, residing at Visalia, county of Tulare, and State of California, have invented new and useful Improvements in Floor-Board Shields for Automobiles, of which the following is a specification.

This invention relates to an accessory for automobiles and particularly pertains to floor board shields.

At the present time, in the most makes of automobiles and particularly in the Ford type of car, considerable draft is created through the openings in the floor which are provided to accommodate the control levers and pedals. Various expedients have been utilized in the past for closing these openings while permitting the free movement of the levers and pedals. In most instances, however, these have proven ineffective and it is the principal object of the present invention to provide a device which may be readily applied to the floor boards of an automobile in a manner to obstruct the passage of air through the lever openings and at the same time to permit the levers and pedals to be easily moved.

The present invention contemplates the use of shield members which may be permanently adapted to the floor boards in such positions as to form a barrier beneath the floor board openings and thus prevent the creation of a draft therethrough.

One form of the invention is illustrated by way of example in—

Figure 1:
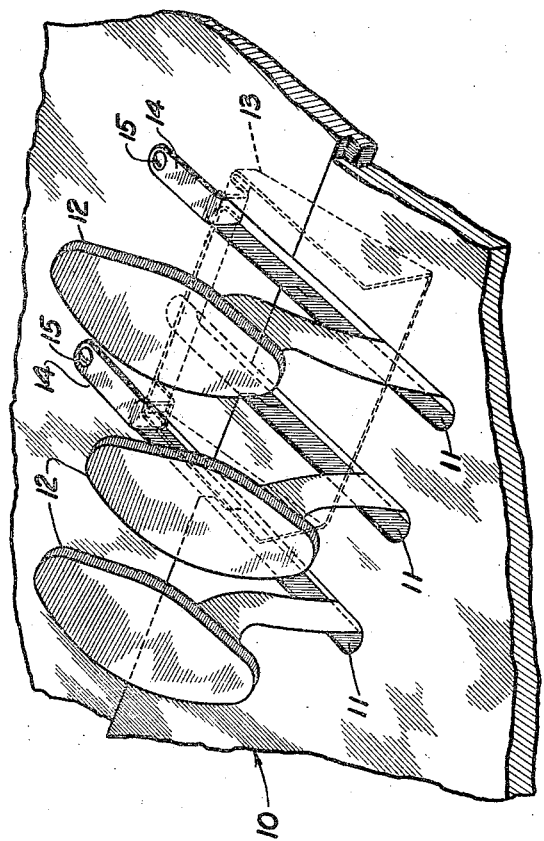

Fig. 1 which is a perspective view showing the foot pedals of automobiles of the Ford type and a manner in which the shield is mounted relative to the floor openings.

Figure 2:
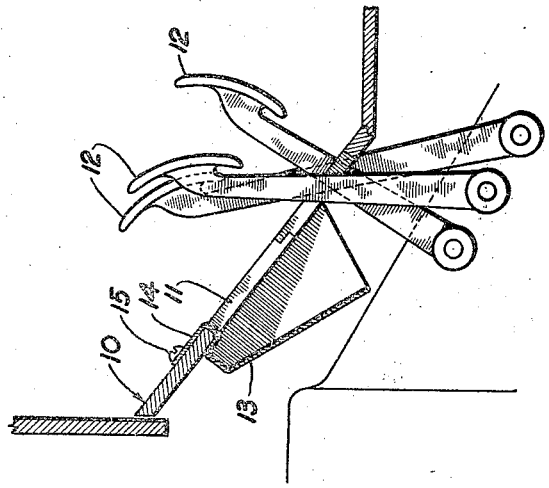

Fig. 2 is a view in vertical section through the floor board showing the manner in which one form of the invention is applied.

Referring more particularly to the drawing, 10 indicates the floor board of an automobile, which board is here shown as disposed at an inclination to the horizontal. This board is formed with one or more floor board openings 11, through which the shanks of hand levers or foot pedals 12 may project and which openings objectionably permit a draft to be created in the car.

In the form of the invention shown in Figs. 1 and 2 a shield member 13 is permanently positioned beneath the floor board in a manner to obstruct the free passage of air through the floor openings 11. This shield is in the form of a pan preferably constructed of sheet metal. The main wall of this pan is disposed at an angle to the under face of the floor board and is curved upwardly at its ends to fit against said face of the floor board. The angle at which the wall of the pan is disposed is determined by the movement of the foot pedals, it being intended to permit a free maximum movement of the foot pedals without obstruction by the shield 13. Fastening clips 14 are secured to the upper end of the shield and project through floor openings 11 where they may be secured to the floor board by screws or nails 15.

In operating the present invention, the forms shown in Figs. 1 and 2 may be readily applied by placing the shield beneath the floor board, thereafter passing the clips 14 through certain of the floor board openings and then fastening the clips to the floor board.

It will thus be seen that the shield means here provided are simple in construction and may be easily applied and will effectively prevent the free circulation of air through the floor board openings of an automobile.

While I have shown the preferred form of my invention as now known to me it will be understood that various changes in the combination and construction and arrangement of parts may be made by those skilled in the art without departing from the spirit of the invention as claimed.

Having thus described my invention, what I claim and desire to secure by Letters Patent is:—

In combination with an automobile floor board having openings therein through which levers project, a shield member located beneath the board and having a main wall disposed at an angle to the under face of the board to permit clearance for operating the levers, the sides and upper end of said main wall being upturned so as to fit against the under side of the board, said upturned sides tapering toward the upturned upper end whereby to provide clearance for the operating levers, and fastening clips extending from the upper end of the shield and through the openings contiguous to the upper ends thereof, said fastening clips after passing through said openings being bent parallel to the upper surface of the board and in contact therewith above the openings whereby they may be secured to the board to hold the shield in place.

GUS MOEBES.